(12) United States Patent
Smiley et al.

(10) Patent No.: US 7,686,168 B1
(45) Date of Patent: Mar. 30, 2010

(54) CONTAINER

(75) Inventors: Charles F. Smiley, Waunakee, WI (US); Michael A. Eckstein, Poynette, WI (US)

(73) Assignee: Traex Company, Toledo, OH (US)

( * ) Notice: Subject to any disclaimer, the term of this patent is extended or adjusted under 35 U.S.C. 154(b) by 816 days.

(21) Appl. No.: 11/545,202

(22) Filed: Oct. 10, 2006

(51) Int. Cl.
*A45C 11/20* (2006.01)
(52) U.S. Cl. ...................................... 206/542; 220/772
(58) Field of Classification Search ................. 220/772, 220/773; 206/541, 542
See application file for complete search history.

(56) References Cited

U.S. PATENT DOCUMENTS

| | | | | |
|---|---|---|---|---|
| 921,404 | A * | 5/1909 | Howard | 220/760 |
| 964,118 | A * | 7/1910 | McCanlis | 220/762 |
| 4,658,975 | A * | 4/1987 | Cone | 215/385 |
| 4,927,046 | A * | 5/1990 | Armstrong | 220/697 |
| 4,941,586 | A * | 7/1990 | Tarna | 222/572 |
| 7,036,693 | B2 * | 5/2006 | Walsh et al. | 222/572 |

OTHER PUBLICATIONS

San Jamar, Advertisement showing SAF-T-ICE ice tote, 2005, one page, Elkhorn, Wisconsin, U.S.A.
C & K Manufacturing & Sales Co., Photograph showing C-KURE ice tote, undated, one page, U.S.A.

* cited by examiner

*Primary Examiner*—Jacob K Ackun, Jr.
(74) *Attorney, Agent, or Firm*—MacMillan, Sobanski & Todd, LLC (57) ABSTRACT

A container for transporting and handling materials such as ice has a side wall having a top, a middle and a bottom. The side wall forms a containing portion. The top has an opening to the containing portion. The side wall has a recess adjacent to the bottom. The container has a bottom wall. The containing portion extends from the bottom wall to the opening. The container has a top handle adjacent to the top of the side wall. The container has a recess handle that extends from the bottom of the side wall to the middle of the side wall adjacent to the recess.

20 Claims, 8 Drawing Sheets

CONTAINER

TECHNICAL FIELD

The invention relates to a container.

BACKGROUND OF THE INVENTION

The invention is directed to a container for transporting and handling materials such as ice.

BRIEF SUMMARY OF THE INVENTION

A container has a side wall having a top, a middle and a bottom. The side wall forms a containing portion. The top has an opening to the containing portion. The side wall has a recess adjacent to the bottom. The container has a bottom wall. The containing portion extends from the bottom wall to the opening. The container has a top handle adjacent to the top of the side wall. The container has a recess handle that extends from the bottom of the side wall to the middle of the side wall adjacent to the recess.

DETAILED DESCRIPTION OF THE INVENTION

Figure 1:
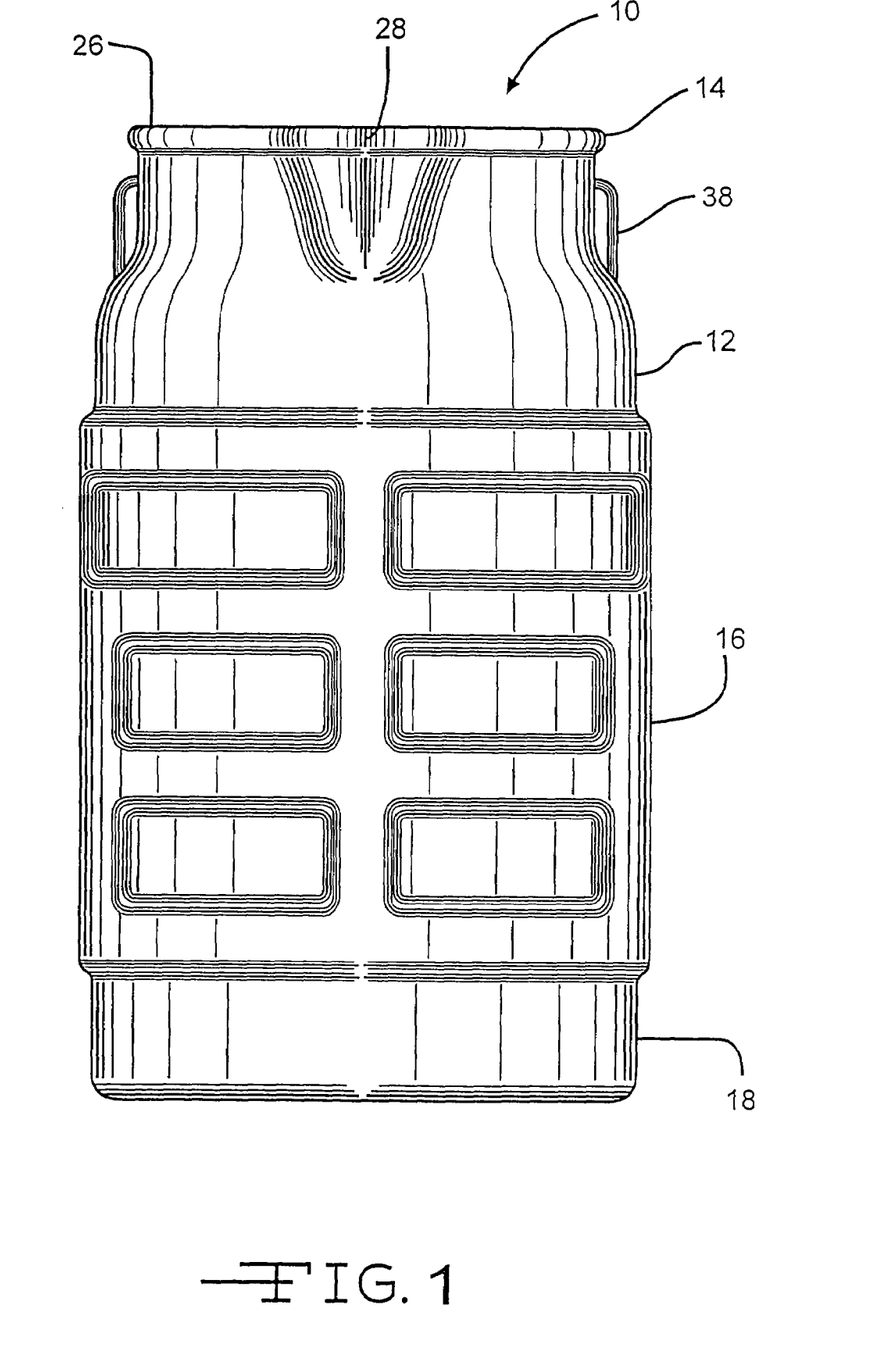
FIG. 1 is a front elevational view of an embodiment of a container according to the invention.
Figure 2:
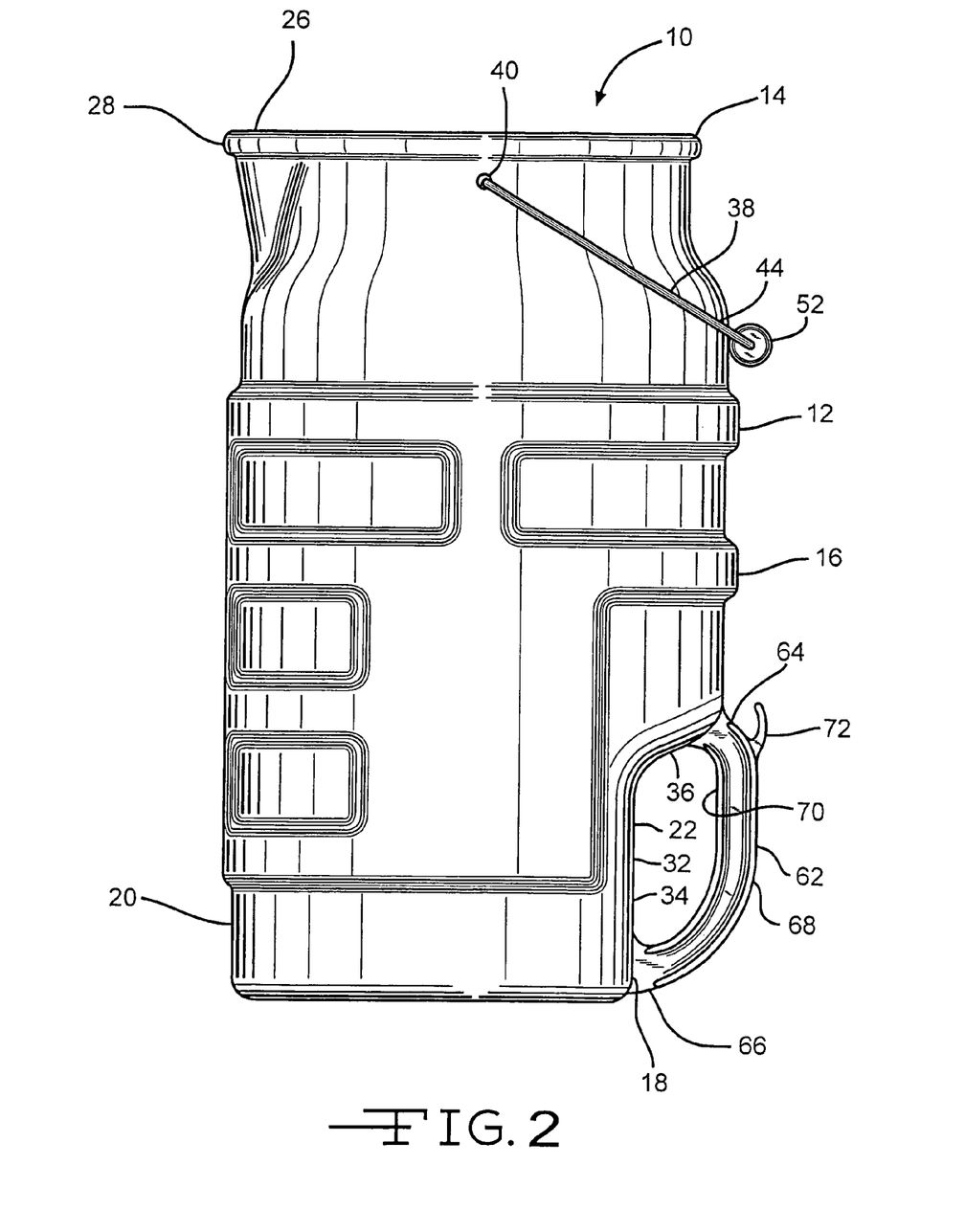
FIG. 2 is a right side elevational view thereof.
Figure 5:
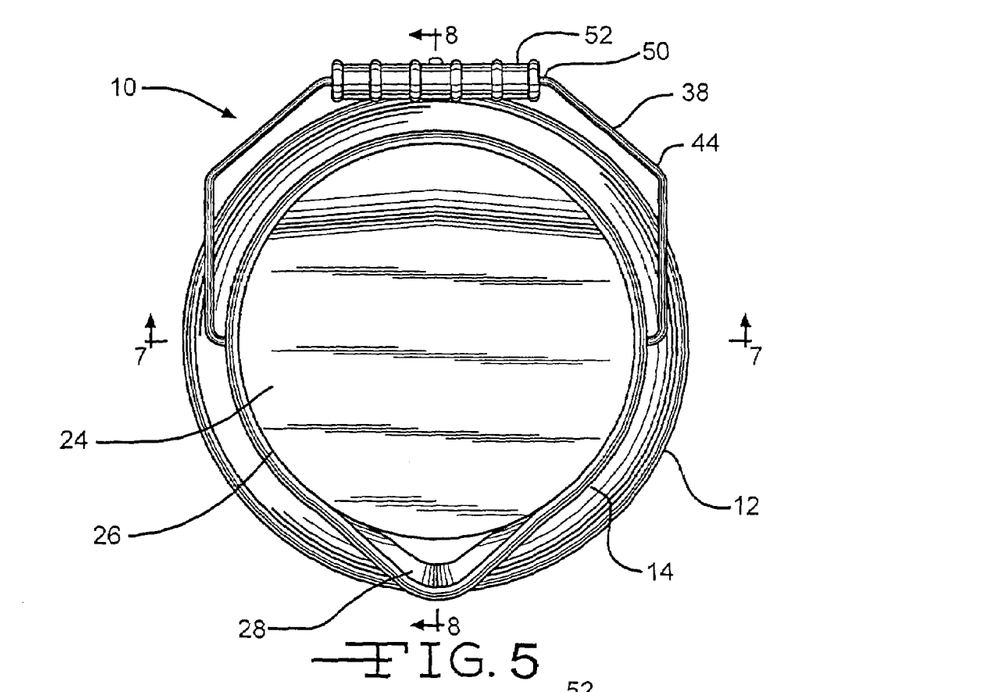
FIG. 5 is a top plan view thereof.
Figure 6:
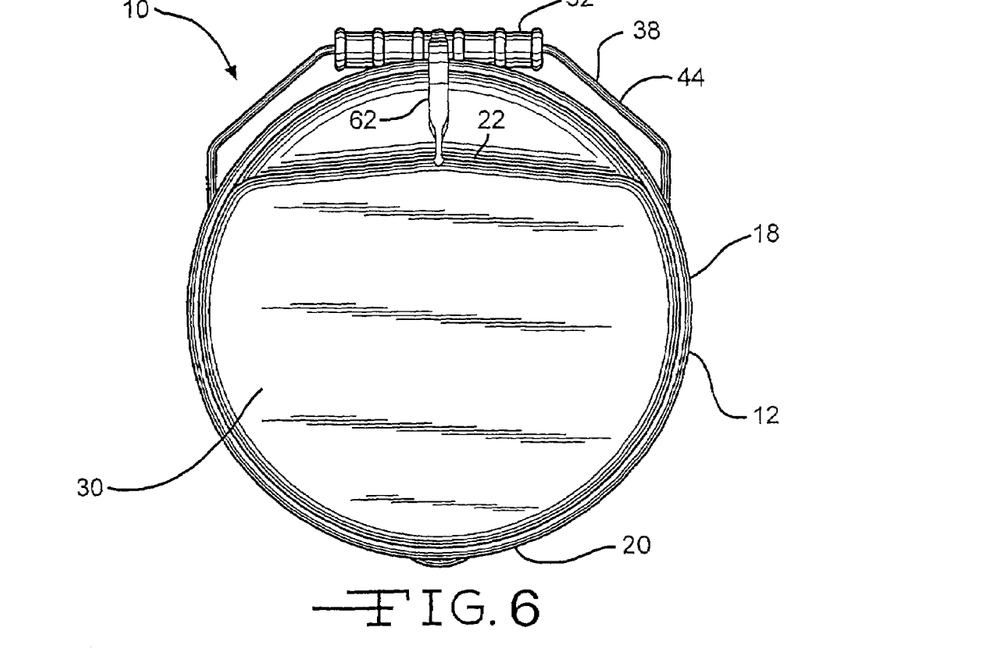
FIG. 6 is a bottom plan view thereof.
Figure 7:
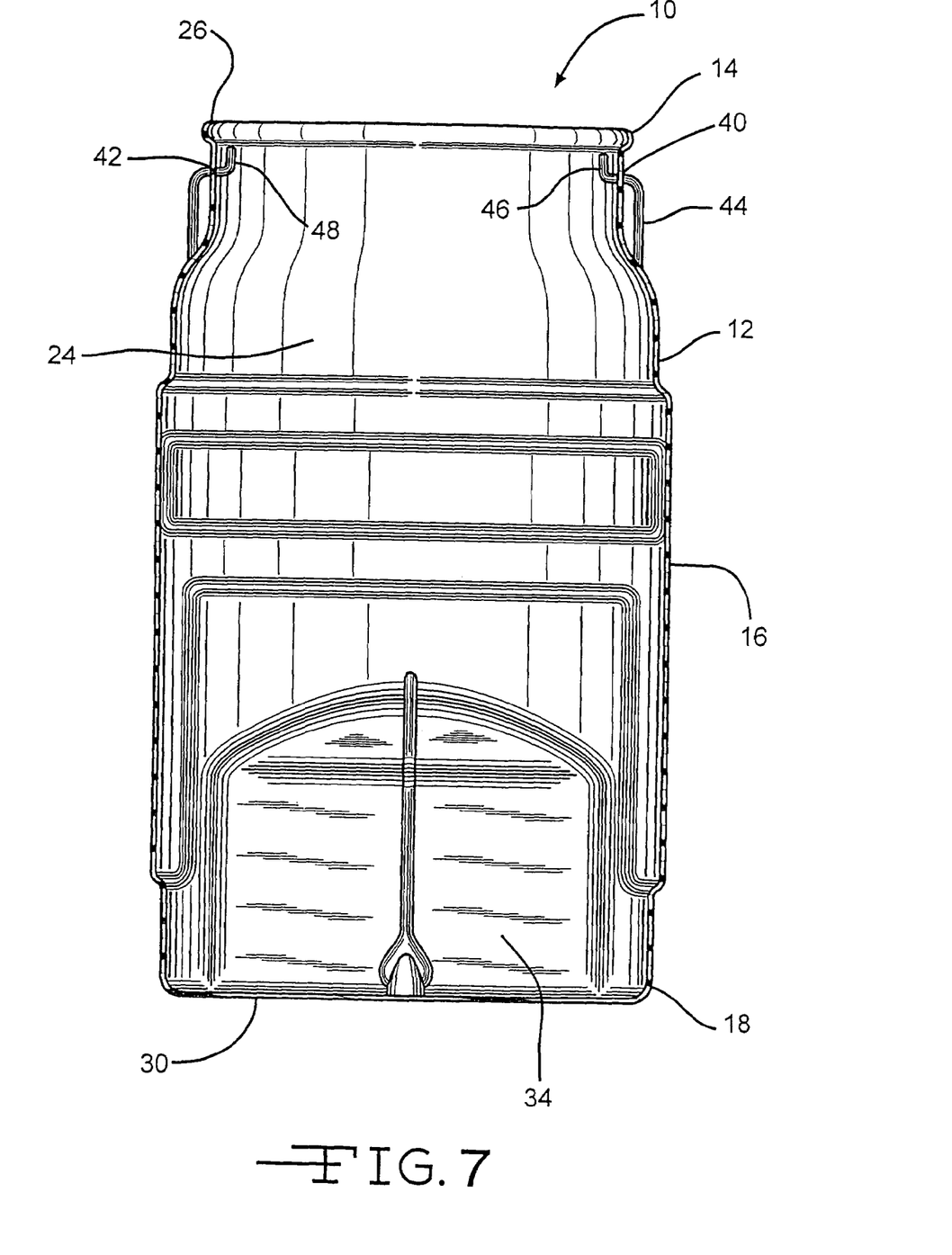
FIG. 7 is a cross-sectional view taken through line 7-7 of FIG. 5.
Figure 8:
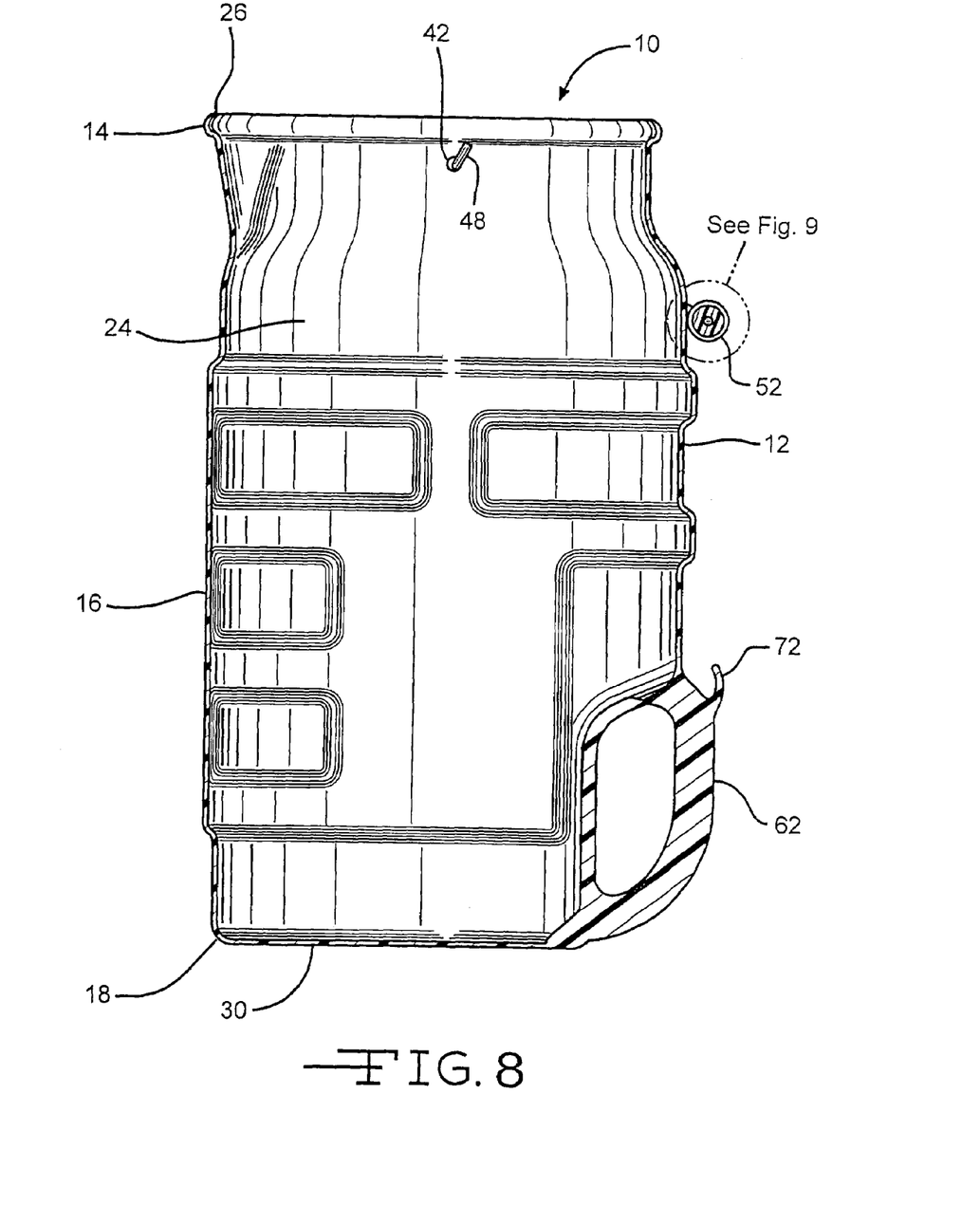
FIG. 8 is a cross-sectional view taken through line 8-8 of FIG. 5.

Referring to the drawings, a container 10 has a side wall 12 having a top 14, a middle 16 and a bottom 18. As shown in FIGS. 2 and 6, the top 14 and the middle 16 of the side wall 12 are substantially cylindrical and the bottom 18 has a substantially cylindrical portion 20 and a substantially planar portion 22. Referring to FIGS. 5, 7 and 8, the side wall 12 forms a containing portion 24. The top 14 has an opening 26 to the containing portion 24. The opening 26 is substantially cylindrical and extends entirely around the top 14 of the side wall 12. As shown in FIGS. 1, 2, 4, 5 and 8, the container 10 has a spout 28 adjacent to the opening 26. Referring to FIGS. 6-8, the container 10 has a bottom wall 30 that is substantially planar. As shown in FIGS. 7 and 8, the containing portion 24 extends from the bottom wall 30 to the opening 26.

Referring to FIGS. 2-4 and 6-8, the side wall 12 has a recess 32 adjacent to the bottom 18. The side wall 12 has a side recess wall 34 adjacent to the bottom 18 and a top recess wall 36 adjacent to the middle 16.

Figure 3:
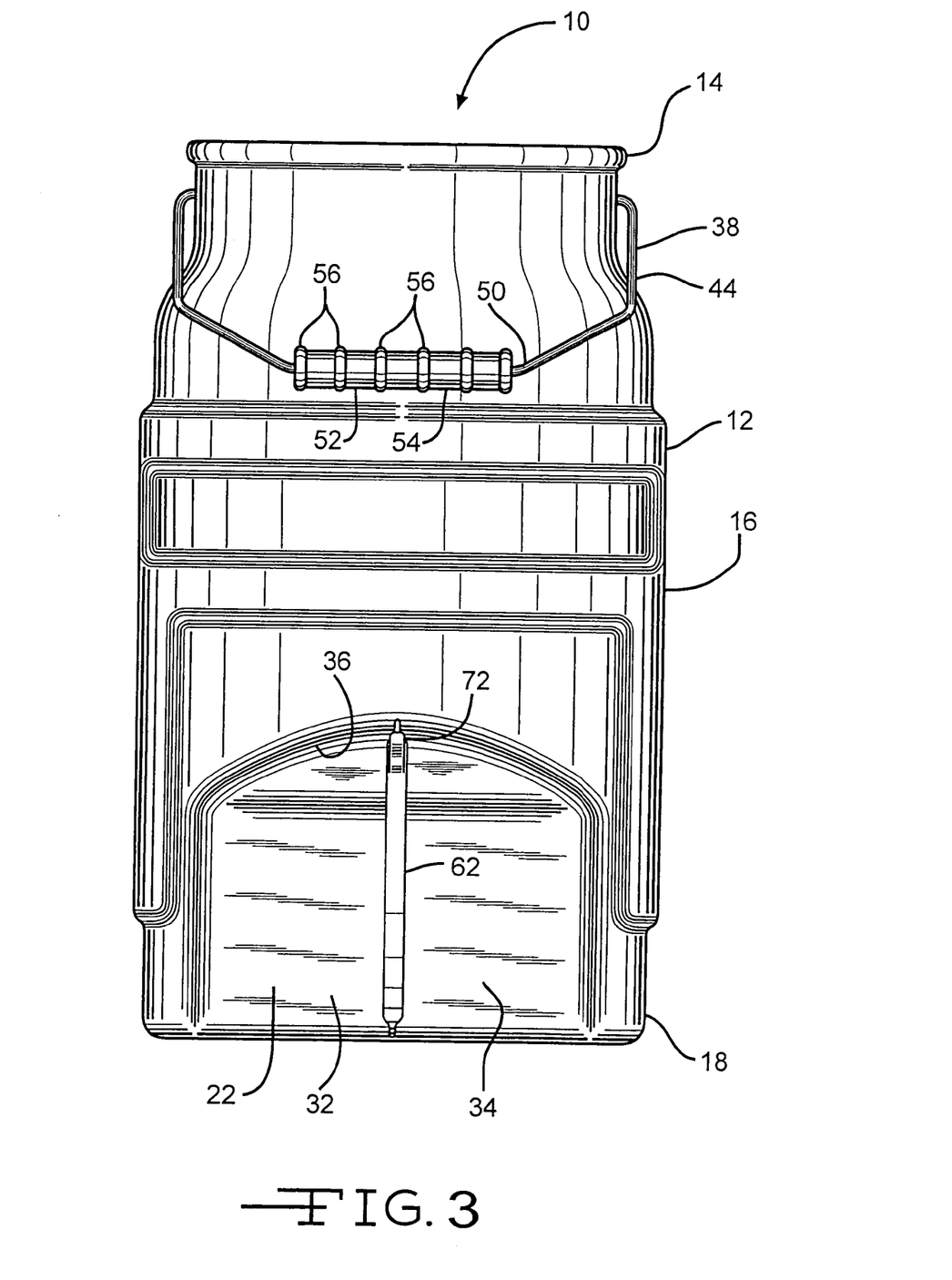
FIG. 3 is a is a back elevational view thereof.
Figure 4:
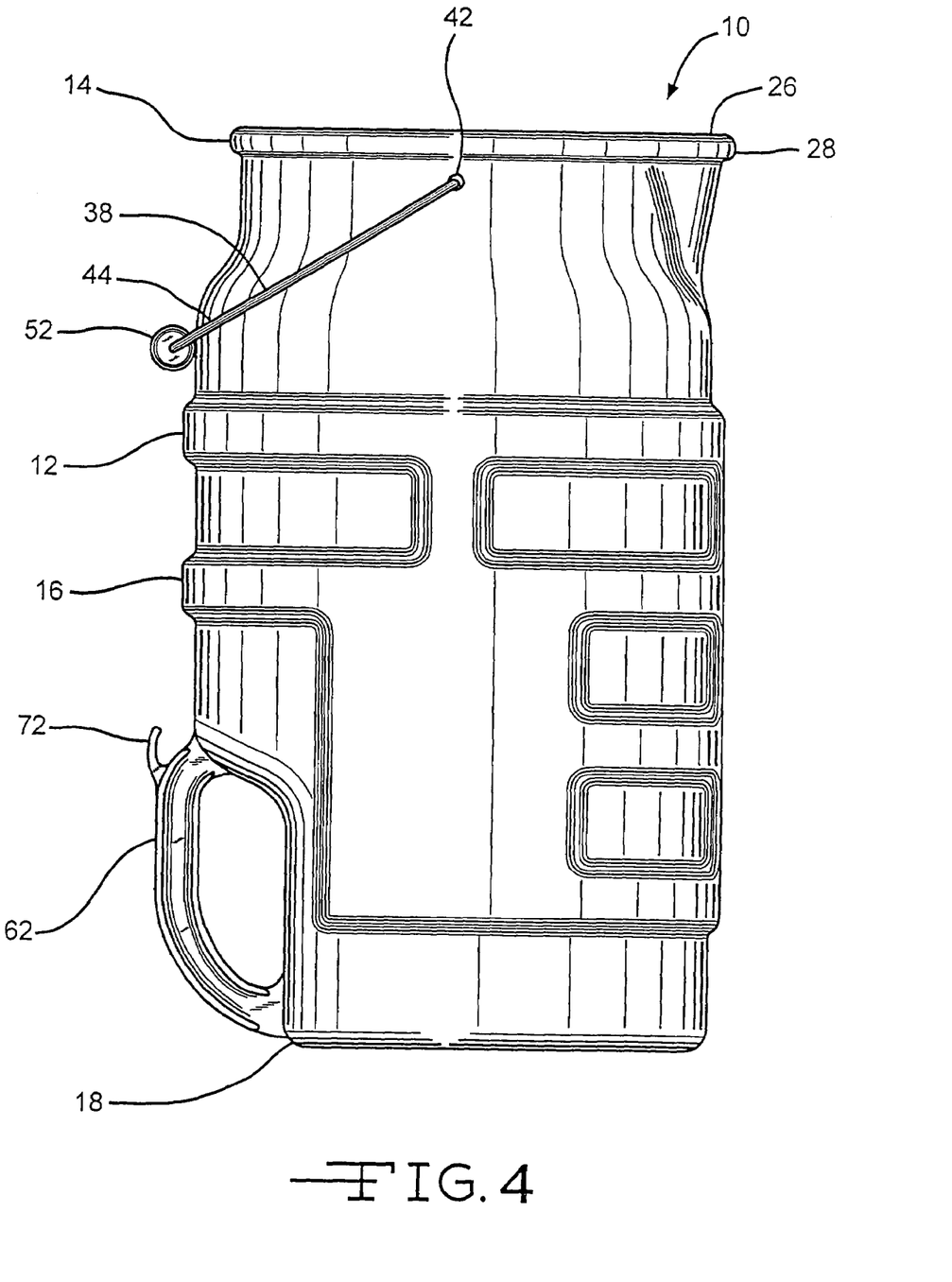
FIG. 4 is a left side elevational view thereof.
Figure 9:
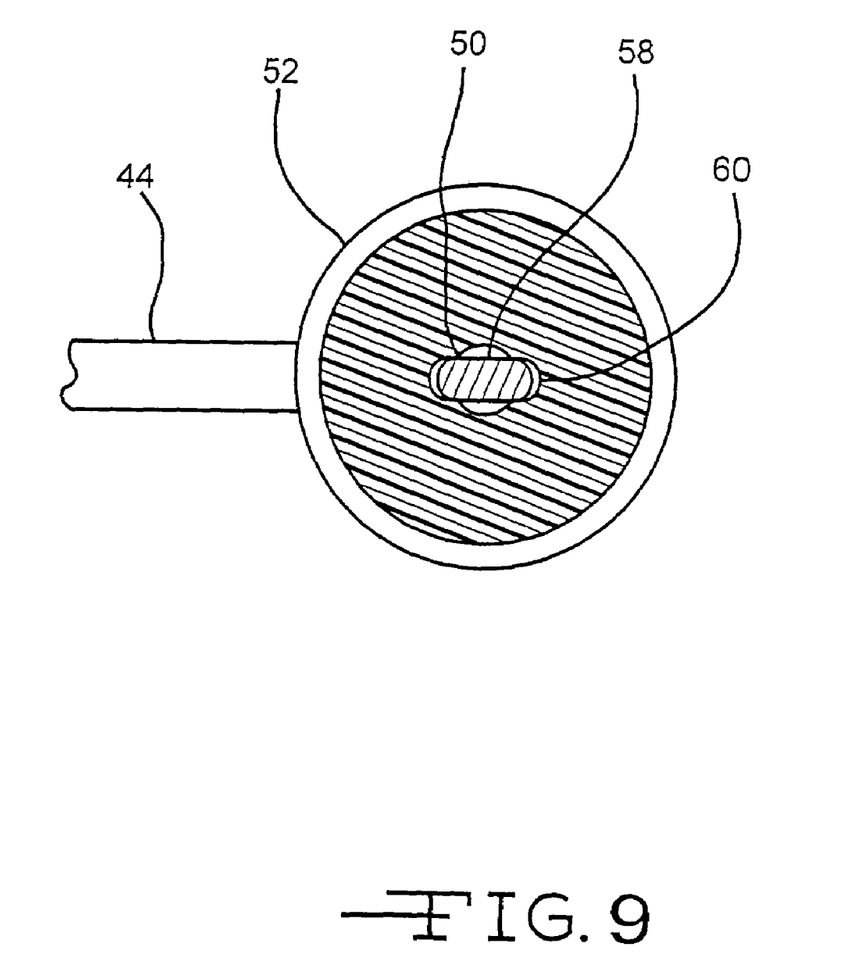
FIG. 9 is an enlarged view as shown in FIG. 8.

Referring to FIGS. 2, 3, 5 and 7-9, the container 10 has a top handle 38 adjacent to the top 14 of the side wall 12. The top 14 has a first hole 40 and an opposed second hole 42. The top handle 38 has a bail 44 having a first attachment member such as a first hook 46 and a second attachment member such as a second hook 48. The first and second hooks 46 and 48 are inserted in the first and second holes 40 and 42, respectively, to attach the top handle 38 to the side wall 12. This attachment allows for the front to back pivotal movement of the top handle 38 on the side wall 12. As shown in FIGS. 3, 5, 8 and 9, the bail 44 also has a handle portion 50 that is substantially straight. A hand grip 52 is positioned on the handle portion 50. As shown in FIG. 3, the hand grip 52 has an exterior surface 54 that includes a plurality of raised gripping portions 56. As shown in FIG. 9, the handle portion 50 has a flattened portion 58. The hand grip 52 has a longitudinally extending center opening 60 having a shape corresponding substantially to the flattened portion 58. This relationship prevents rotation of the hand grip 52 on the handle portion 50 of the bail 44.

Referring to FIGS. 2-4 and 6-8, the container 10 has a recess handle 62 adjacent to the recess 32 that extends from the bottom 18 of the side wall 12 to the middle 16 of the side wall 12. In an embodiment of the invention, the recess handle 62 extends vertically from the side recess wall 34 to the top recess wall 36. The recess handle 62 has a top end 64, a bottom end 66, an outside portion 68 and an inside portion 70. The top end 64 is adjacent to the middle 16 of the side wall 12 and the bottom end 66 is adjacent to the bottom 18 of the side wall 12. The recess handle 62 is curved between the top and bottom ends 64 and 66. As shown in FIGS. 2-4 and 8, the container 10 has an integral hanging hook 72 on the recess handle 62. In an embodiment of the invention, the hanging hook 72 extends outwardly and upwardly from the outside portion 68 adjacent to the top end 64. The inside portion 70 of the recess handle 62 is smooth.

In an embodiment of the invention, the side wall 12, the bottom wall 12 and the recess handle 62 are integral and made of plastic. The hand grip 52 is made of plastic. The bail 44 is made of metal.

The container 10 is used to transport and handle materials such as ice. For example, a user carries an empty container 10 to an ice machine by gripping the hand grip 52 of the top handle 38. At the ice machine, the user grips the hand grip 52 with, for example, his or her left hand and the recess handle 62 with his or her right hand. The user then scoops a desired amount of ice through the opening 26 into the containing portion 24. The user then carries the filled container 10 to a place where the ice is needed. The ice is emptied by gripping the hand grip 52 and lifting the recess handle 62 upwardly to tip the container 10 to allow the ice to fall through the opening 26. The spout 28 guides the falling ice. After use, the container 10 can be hung upside down on the hanging hook 72 to allow water from melted ice to drip from the opening 26 to dry the containing portion 24.

While the invention as been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

We claim:

1. A container comprising:

a side wall having a top, a middle and a bottom, the side wall forming a containing portion, the top having an opening to the containing portion, the side wall having a recess adjacent to the bottom;

a bottom wall, the containing portion extending from the bottom wall to the opening;

a top handle adjacent to the top of the side wall; and a recess handle extending from the bottom of the side wall to the middle of the side wall adjacent to the recess, the recess handle having a hanging hook.

2. The container of claim 1, wherein the top and the middle of the side wall are substantially cylindrical and the bottom of the side wall has a substantially cylindrical portion and a substantially planar portion adjacent to the recess.

3. The container of claim 1, wherein the opening is substantially cylindrical.

4. The container of claim 1, wherein the opening extends entirely around the top of the side wall.

5. The container of claim 1, wherein the container has a spout adjacent to the opening.

6. The container of claim 1, wherein the side wall has a side recess wall adjacent to the bottom of the side wall and a top recess wall adjacent to the middle of the side wall.

7. The container of claim 6, wherein the recess handle extends from the side recess wall to the top recess wall.

8. The container of claim 1, wherein the bottom wall is substantially planar.

9. The container of claim 1, wherein the top handle is movably positioned on the top of the side wall.

10. The container of claim 1, wherein the top of the side wall has two opposed holes, the top handle having two attachment members for insertion in the holes to movably position the top handle on the top of the side wall.

11. The container of claim 1, wherein the top handle has a hand grip.

12. The container of claim 11, wherein the hand grip has a plurality of raised portions.

13. The container of claim 1, wherein the recess handle is curved.

14. The container of claim 1, wherein the recess handle has a top end, a bottom end, an outside portion and an inside portion.

15. The container of claim 14, wherein the top end is adjacent to the middle of the side wall and the bottom end is adjacent to the bottom of the side wall.

16. The container of claim 14, wherein the hanging hook is adjacent to the outside portion.

17. The container of claim 16, wherein the hanging hook is integral with the recess handle.

18. The container of claim 16, wherein the hanging hook is adjacent to the top end.

19. The container of claim 16, wherein the hanging hook extends outwardly and upwardly from the outside portion.

20. The container of claim 13, wherein the interior portion is substantially smooth.

* * * * *